United States Patent
Hong et al.

(10) Patent No.: US 10,669,367 B2
(45) Date of Patent: Jun. 2, 2020

(54) POLYTHIOL COMPOSITION FOR PLASTIC LENS

(71) Applicant: SKC CO., LTD., Suwon-si, Gyeonggi-do (KR)

(72) Inventors: Seung Mo Hong, Incheon (KR); Jongmin Shim, Hwaseong-si (KR); Junghwan Shin, Suwon-si (KR)

(73) Assignee: SKC CO., LTD., Suwon-si (KR)

( * ) Notice: Subject to any disclaimer, the term of this patent is extended or adjusted under 35 U.S.C. 154(b) by 115 days.

(21) Appl. No.: 15/887,077

(22) Filed: Feb. 2, 2018

(65) Prior Publication Data

US 2018/0223031 A1    Aug. 9, 2018

(30) Foreign Application Priority Data

Feb. 3, 2017    (KR) ......................... 10-2017-0015509

(51) Int. Cl.
   *C08G 18/38*    (2006.01)
   *B29D 11/00*    (2006.01)
   *G02B 1/04*     (2006.01)
   *C08G 18/76*    (2006.01)
   *C08K 5/36*     (2006.01)
   *C08G 18/82*    (2006.01)
   (Continued)

(52) U.S. Cl.
   CPC ...... *C08G 18/3876* (2013.01); *C08G 18/7642* (2013.01); *C08G 18/82* (2013.01); *C08K 5/36* (2013.01); *C08K 5/5397* (2013.01); *C08L 75/04* (2013.01); *G02B 1/041* (2013.01)

(58) Field of Classification Search
   CPC ....... C08K 5/5397; C08L 75/04; C08L 81/00; G02B 1/041; B29D 11/00
   See application file for complete search history.

(56) References Cited

U.S. PATENT DOCUMENTS 5,352,758 A * 10/1994 Kanemura ............ C07C 321/14
                                                     359/642
5,631,339 A *  5/1997 Faler .................. C08G 18/8025
                                                     524/198

(Continued)

FOREIGN PATENT DOCUMENTS

EP    0 742 244 A2    11/1996
EP    2 008 998 A1    12/2008

(Continued)

OTHER PUBLICATIONS

European Patent Office; Communication dated Jun. 29, 2018 issued in counterpart EP application No. 18154995.7.

(Continued)

*Primary Examiner* — Sanza L. McClendon
(74) *Attorney, Agent, or Firm* — Sughrue Mion, PLLC

(57) ABSTRACT

An embodiment relates to a polythiol composition for a plastic lens. The polythiol composition for a plastic lens according to the embodiment can produce a clear and transparent plastic lens by way of polymerizing such raw materials as a polythiol compound, an isocyanate, a photoactive color correcting agent, and the like, followed by a simple post-process such as irradiation of ultraviolet rays. In addition, since the process for preparing the lens is simple and economical, the lens is advantageously used for manufacturing various plastic lenses such as eyeglass lenses and camera lenses.

6 Claims, 1 Drawing Sheet

(51) Int. Cl.
*C08K 5/5397* (2006.01)
*C08L 75/04* (2006.01)

(56) References Cited

U.S. PATENT DOCUMENTS

| | | | | |
|---|---|---|---|---|
| 5,679,756 | A * | 10/1997 | Zhu | C08G 18/10 528/65 |
| 5,693,738 | A * | 12/1997 | Okazaki | C08G 18/1875 528/51 |
| 5,932,681 | A * | 8/1999 | Herold | C08G 18/3876 359/241 |
| 5,955,206 | A | 9/1999 | Okazaki et al. | |
| 7,473,754 | B1 * | 1/2009 | Okoroafor | C08G 18/3876 522/6 |
| 2006/0155093 | A1 * | 7/2006 | Kitahara | C07C 323/52 528/44 |
| 2009/0264613 | A1 | 10/2009 | Kuma et al. | |
| 2010/0118263 | A1 * | 5/2010 | Tamura | C08G 18/10 351/159.65 |
| 2010/0201939 | A1 * | 8/2010 | Itoh | B29C 39/006 351/159.63 |
| 2011/0062396 | A1 * | 3/2011 | Kasai | C07D 311/92 252/586 |
| 2011/0112269 | A1 * | 5/2011 | Iwazumi | C08G 18/18 528/71 |
| 2012/0065336 | A1 * | 3/2012 | Mizori | C08K 5/37 525/301 |
| 2012/0154739 | A1 | 6/2012 | Turshani et al. | |
| 2015/0018507 | A1 | 1/2015 | Jang et al. | |
| 2016/0167323 | A1 * | 6/2016 | Valeri | B29D 11/00432 351/159.01 |

FOREIGN PATENT DOCUMENTS

| | | |
|---|---|---|
| EP | 2 808 321 A1 | 12/2014 |
| JP | 5-25240 A | 2/1993 |
| JP | 9-110983 A | 4/1997 |
| JP | 2013-7784 A | 1/2013 |
| KR | 10-1338568 B1 | 12/2013 |
| KR | 10-1464942 B1 | 11/2014 |

OTHER PUBLICATIONS

Japanese Patent Office; Communication dated Dec. 11, 2018 in counterpart application No. 2018-017148.

* cited by examiner

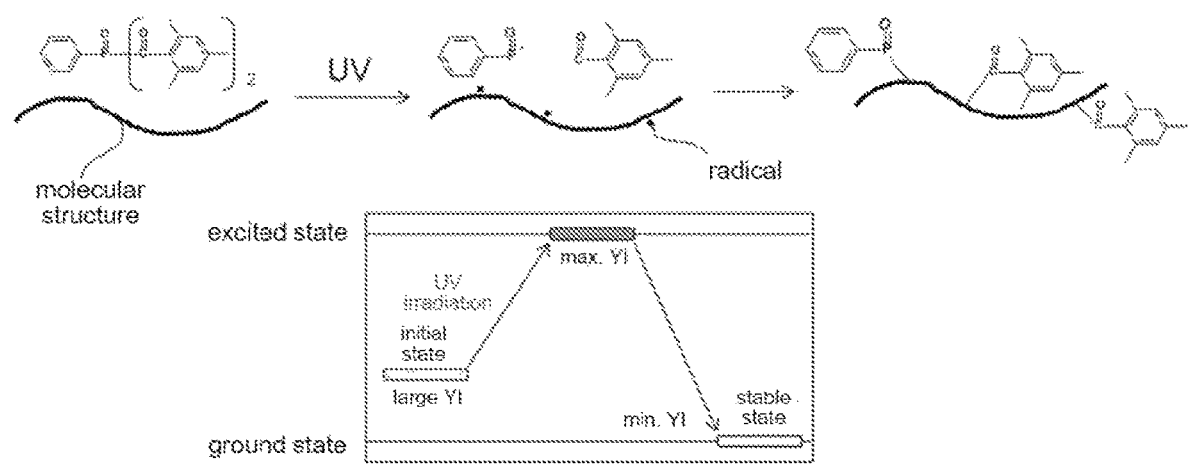

POLYTHIOL COMPOSITION FOR PLASTIC LENS

TECHNICAL FIELD

An embodiment relates to a polythiol composition for a plastic lens. In addition, another embodiment relates to a polymerizable composition comprising the polythiol composition, and a polythiourethane-based compound and a plastic lens obtained therefrom.

BACKGROUND ART

Plastic optical materials are lightweight, hardly breakable, and excellent in dyeability as compared with optical materials made of inorganic materials such as glass. Therefore, plastic materials of various resins are widely used as optical materials for eyeglass lenses, camera lenses, and so on. In recent years, there has been an increased demand for higher performance of optical materials, particularly in terms of high transparency, high refractive index, low specific gravity, high heat resistance, and high impact resistance.

A polythiourethane-based compound is widely used as an optical material by virtue of its excellent optical features and excellent mechanical properties. A polythiourethane-based compound can be prepared by polymerization of a polythiol compound and an isocyanate compound. In such event, the physical properties of the polythiol compound have significant impacts on the physical properties of the polythiourethane-based compound to be prepared.

Lenses made from a polythiourethane compound are widely used by virtue of their high refractive index, light weight, and relatively high impact resistance. However, since the polythiourethane-based lenses have a lower Abbe number than that of glass lenses, the sharpness of the polythiourethane-based lenses is lower than that of the glass lenses, which results in a greater eye fatigue when the lenses are worn. Further, the polythiourethane-based lenses have a lower heat resistance than that of the glass lenses.

In recent years, efforts have been made to improve the optical properties thereof such as transparency and refractive index by way of increasing the purity of the raw materials or controlling the reaction in an attempt to obtain a transparency equivalent to that of glass.

For example, Korean Patent No. 1338568 discloses a process for preparing a polythiol compound by hydrolyzing an isothiouronium salt obtained by reacting a (poly) halogen compound or a (poly)alcohol compound with a thiourea, in which a colorless and transparent (poly)thiol compound is obtained as the content of calcium in the thiourea is 1.0% by weight or less. In addition, Korean Patent No. 1464942 discloses a process for preparing a polythiol compound for an optical material, which comprises reacting an epichlorohydrin compound with 2-mercaptoethanol, wherein the total amount of impurities contained in the epichlorohydrin compound is 0.45% by weight or less, and wherein the impurities consist of acrolein, allylchloride, 1,2-dichloropropane, 2,3-dichloropropene, 2-methyl-2-pentanol, 2-chloroaryl alcohol, cis-1,3-dichloropropene, trans-1,3-dichloropropene, 1,3-dichloroisopanol, 1,2,3-trichloropropane, and 2,3-dichloropropanol.

PRIOR ART DOCUMENT

Patent Document (Patent Document 1) Korean Patent No. 1338568
(Patent Document 2) Korean Patent No. 1464942

DISCLOSURE OF INVENTION

Technical Problem

However, the technique disclosed in Korean Patent No. 1338568 controls the purity of the thiourea, which is a raw material of the polythiol compound, and the technique disclosed in Korean Patent No. 1464942 controls the purity of epichlorohydrin, which is a raw material of the polythiol compound. Thus, there is a limit to the production of clear and transparent lenses having a transparency equivalent to that of glass. In addition, in the case where only the purity of the raw materials is controlled, it is difficult to prevent the yellowing that may be generated in the manufacture of lenses, as well as the lenses produced therefrom are disadvantageous in terms of the quality, workability, and economics.

Accordingly, an embodiment aims to provide a polythiol composition for a plastic lens having the advantage of high transparency, which is an advantage of a glass lens, while maintaining the advantages of a polythiourethane-based plastic lens; and a polythiourethane-based compound and a plastic lens obtained therefrom.

Solution to Problem

An embodiment provides a polythiol composition, which comprises a bi- or higher functional polythiol compound and a compound represented by the following Formula 1:

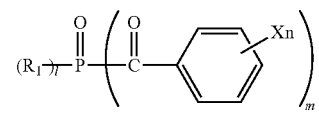

[Formula 1]

Wherein, $R_1$ is $C_{1-10}$ alkyl, $C_{1-10}$ alkoxy, phenyl, or $C_{1-10}$ alkyl substituted with a halogen, X is $C_{1-10}$ alkyl, $C_{1-10}$ alkoxy, nitro substituted with a halogen, $C_{1-20}$ dialkylamino, or cyano, l and m are each independently 1 or 2, l+m=3, and n is an integer of 0 to 3, wherein when l is 2, $R_1$ may be the same as, or different from, each other, and when n is 2 or 3, X may be the same as, or different from, each other.

Furthermore, another embodiment provides a polymerizable composition for a polythiourethane-based lens, which comprises an isocyanate compound, a polythiol compound, and a photoactive color correcting agent.

In addition, another embodiment provides a process for preparing a polythiourethane-based lens, which comprises (1) providing a polymerizable composition comprising an isocyanate compound, a polythiol compound, and a photoactive color correcting agent, (2) thermally curing the polymerizable composition to produce a polythiourethane-based resin, and (3) irradiating the polythiourethane-based resin with ultraviolet rays to reduce the yellow index of the polythiourethane-based resin.

Advantageous Effects of Invention

The polythiol composition for a plastic lens according to the embodiment can produce a clear and transparent plastic lens by way of polymerizing such raw materials as a polythiol compound, an isocyanate, and the like, followed by a simple post-process such as irradiation of ultraviolet rays. In addition, since the process for preparing the lens is simple and economical, the lens is advantageously used for manufacturing various plastic lenses such as eyeglass lenses and camera lenses.

BRIEF DESCRIPTION OF THE DRAWINGS

FIG. 1 is a schematic view illustrating the states of the molecular structure of the polythiol composition according to an example before and after irradiation with ultraviolet rays.

BEST MODE FOR CARRYING OUT THE INVENTION

An embodiment provides a polythiol composition, which comprises a bi- or higher functional polythiol compound and a compound represented by the following Formula 1:

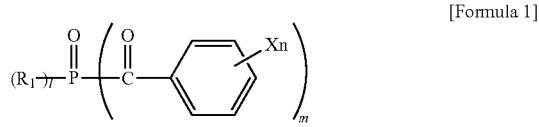

[Formula 1]

Wherein, $R_1$ is $C_{1-10}$ alkyl, $C_{1-10}$ alkoxy, phenyl, or $C_{1-10}$ alkyl substituted with a halogen, X is $C_{1-10}$ alkyl, $C_{1-10}$ alkoxy, nitro substituted with a halogen, $C_{1-20}$ dialkylamino, or cyano, l and m are each independently 1 or 2, l+m=3, and n is an integer of 0 to 3, wherein when l is 2, $R_1$ may be the same as, or different from, each other, and when n is 2 or 3, X may be the same as, or different from, each other.

The polythiol composition may comprise the compound represented by Formula 1 above and a bi- or higher functional polythiol compound, particularly a tri- or higher functional polythiol compound.

The compound represented by Formula 1 above may be a phosphine oxide-based compound. For example, it may be bis(2,4,6-trimethylbenzoyl)-phenylphosphine oxide, 2,4,5-trimethylbenzoylphenylpho sphinate, ethyl 2,4,6-trimethylbenzoylphenylphosphinate. Specifically, it may be bis(2,4,6-trimethylbenzoyl)-phenylphosphine oxide or 2,4,5-trimethylbenzoylphenylphosphinate.

The compound represented by Formula 1 above may be employed in an amount of 50 to 40,000 ppm, particularly 55 to 30,000 ppm, based on the composition. If the amount of the compound is within the above range, it may correct and maintain the color of a plastic lens produced from the composition to be more vividly and transparently after the irradiation of ultraviolet rays.

The bi- or higher functional polythiol compound may be an organic polythiol.

The organic polythiol may be selected from the group consisting of 1,2-bis[(2-mercaptoethyl)thio]-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 2,5-bis(mercaptomethyl)-1,4-dithiane, pentaerythritol tetra(mercaptoacetate), pentaerythritol tetra(3-mercaptopropionate), trimethylolpropane tri(mercaptoacetate), trimethylolpropane tri(3-mercaptopropionate), dipentaerythritol hexa(mercaptoacetate), dipentaerythritol hexa(3-mercaptopropionate), bis(2-(2-mercaptoethylthio)-3-mercaptopropyl) sulfide, 4-mercaptomethyl-1,8-dimercapto-3,6-dithiaoctane, 2,3-bis(2-mercaptoethylthio)propane-1-thiol, 2,2-bis(mercaptomethyl)-1,3-propanedithiol, bis(2-mercaptoethyl) sulfide, tetrakis(mercaptomethyl)methane, 2-(2-mercaptoethylthio)propane-1,3-dithiol, 2-(2,3-bis(2-mercaptoethylthio)propylthio)ethanethiol, bis(2,3-dimercaptopropanyl) sulfide, bis(2,3-dimercaptopropanyl) disulfide, 1,2-bis(2-(2-mercaptoethylthio)-3-mercaptopropylthio)ethane, 2-(2-mercaptoethylthio)-3-2-mercapto-3-[3-mercapto-2-(2-mercaptoethylthio)-propylthio]propylthio-propane-1-thiol, 2,2-bis-(3-mercapto-propionyloxymethyl)-butyl ester, 2-(2-mercaptoethylthio)-3-(2-(2-[3-mercapto-2-(2-mercaptoethylthio)-propylthio]ethylthio)ethylthio)propane-1-thiol, (4R,11S)-4,11-bis(mercaptomethyl)-3,6,9,12-tetrathiatetradecane-1,14-dithiol, (S)-3-((R-2,3-dimercaptopropyl)thio)propane-1,2-dithiol, (4R,14R)-4,14-bis(mercaptomethyl)-3,6,9,12,15-pentathiaheptane-1,17-dithiol, (S)-3-((R-3-mercapto-2-((2-mercaptoethyl)thio)propylthio)propylthio)-2-((2-mercaptoethyl)thio)propane-1-thiol, 3,3'-dithiobis(propane-1,2-dithiol), (7R,11S)-7,11-bis(mercaptomethyl)-3,6,9,12,15-pentathiaheptadecane-1,17-dithiol, (7R,12S)-7,12-bis(mercaptomethyl)-3,6,9,10,13,16-hexathiaoctadecane-1,18-dithiol, pentaerythritol tetrakis(3-mercaptopropionate), trimethylolpropane tris(3-mercaptopropionate), pentaerythritol tetrakis(2-mercaptoacetate), bispentaerythritol ether hexakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane, 2-(2,2-bis(mercaptodimethylthio)ethyl)-1,3-dithiane, and a mixture thereof.

Specifically, it may be 1,2-bis[(2-mercaptoethyl)thio]-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 2,5-bis(mercaptomethyl)-1,4-dithiane, pentaerythritol tetra(mercaptoacetate), pentaerythritol tetra(3-mercaptopropionate), trimethylolpropane tri(mercaptoacetate), trimethylolpropane tri(3-mercaptopropionate), dipentaerythritol hexa(mercaptoacetate), dipentaerythritol hexa(3-mercaptopropionate), or a mixture thereof.

More specifically, it may be 1,2-bis[(2-mercaptoethyl)thio]-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 2,5-bis(mercaptomethyl)-1,4-dithiane, or a mixture thereof.

The composition satisfies the following Equation 1, when the transmittance at 400 nm in the light spectrum is $T_{400}$ (%) and the transmittance at 450 nm is $T_{450}$ (%):

$$30 < A = (T_{450}\%) - (T_{400}\%) < 95.$$ [Equation 1]

In this equation, A represents the difference in transmittance at 400 nm and 450 nm, and the smaller the A value is, the lower the yellow index (Y.I.) is. The Y.I. value can be measured using a device capable of measuring chromaticity coordinates. When the polythiol composition is represented by the L*a*b* color space (Lab color space), b* may be 1.0 or more, 1.5 or more, or 2.0 or more. Y.I. and b* are parameters of a color evaluation method well known in the art. Y.I. is conveniently used to evaluate the color of a solid, and b* is conveniently used to evaluate the color of a liquid.

Another embodiment provides a polymerizable composition for a polythiourethane-based lens, which comprises an isocyanate compound, a polythiol compound, and a photoactive color correcting agent.

The photoactive color correcting agent may comprise the compound represented by Formula 1 above.

The polymerizable composition, which comprises the photoactive color correcting agent, can further reduce the yellow index of the polythiourethane-based resin formed by curing the polymerizable composition upon irradiation of ultraviolet rays. In such event, the ultraviolet rays may be irradiated at a wavelength of 395 nm to 445 nm in the UVV region at an intensity of 1 J to 3 J for 5 minutes to 50 minutes, 10 minutes to 50 minutes, 5 minutes to 45 minutes, or 10 minutes to 45 minutes.

Specifically, when the yellow index of the polythiourethane-based resin formed by thermally curing the polymerizable composition is referred to as a first yellow index and the yellow index after the polythiourethane-based resin is irradiated with ultraviolet rays is referred to as a second yellow index, the first yellow index is greater than the second yellow index.

More specifically, the second yellow index may be from 0.1 to 5.5, from 0.1 to 5.4, from 0.5 to 5.4, or from 1.0 to 5.4. In such event, the first yellow index may be greater than the second yellow index by a certain value. For example, the difference between the first yellow index and the second yellow index may be at least 0.11; and more particularly, the difference between the first yellow index and the second yellow index may be at least 0.2.

The isocyanate compound may be a conventional one commonly used for the synthesis of polythiourethane.

Specifically, it may be selected from the group consisting of an aliphatic isocyanate-based compound such as isophorone diisocyanate, dicyclohexylmethane-4,4-diisocyanate, hexamethylene diisocyanate, 2,2-dimethyl pentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecatriisocyanate, 1,3,6-hexamethylene triisocyanate, 1,8-diisocyanate-4-isocyanatomethyloctane, bis(isocyanatoethyl) carbonate, bis(isocyanatoethyl) ether, 1,2-bis(isocyanatomethyl) cyclohexane, 1,3-bis(isocyanatomethyl) cyclohexane, 1,4-bis(isocyanatomethyl) cyclohexane, dicyclohexylmethane diisocyanate, cyclohexane diisocyanate, methylcyclohexane diisocyanate, dicyclohexyldimethylmethane isocyanate, 2,2-dimethyldicyclohexylmethane isocyanate, bis(isocyanatoethyl) sulfide, bis(isocyanatopropyl) sulfide, bis(isocyanatohexyl) sulfide, bis(isocyanatomethyl) sulfone, bis(isocyanatomethyl) disulfide, bis(isocyanatopropyl) disulfide, bis(isocyanatomethylthio)methane, bis(isocyanatoethylthio) methane, bis(isocyanatoethylthio)ethane, bis(isocyanatomethylthio)ethane, 1,5-diisocyanato-2-isocyanatomethyl-3-thiapentane, 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane; and an aromatic isocyanate compound such as bis(isocyanatoethyl)benzene, bis(isocyanatopropyl)benzene, bis(isocyanatobutyl)benzene, bis(isocyanatomethyl)naphthalene, bis(isocyanatomethyl) diphenyl ether, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluene diisocyanate, toluidine diisocyanate, 4,4-diphenylmethane diisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, hexahydrobenzene diisocyanate, hexahydrodiphenylmethane-4,4-diisocyanate, o-xylene diisocyanate, m-xylene diisocyanate, p-xylene diisocyanate, xylene diisocyanate, X-xylene diisocyanate, 1,3-bis(isocyanatomethyl)cyclohexane, diphenyl sulfide-2,4-diisocyanate, diphenyl sulfide-4,4-diisocyanate, 3,3-dimethoxy-4,4-diisocyanatodibenzyl thioether, bis(4-isocyanatomethylbenzene) sulfide, 4,4-methoxybenzenethioethylene glycol-3,3-diisocyanate, diphenyl disulfide-4,4-diisocyanate, 2,2-dimethyl diphenyl disulfide-5,5-diisocyanate, 3,3-dimethyl diphenyl disulfide-5,5-diisocyanate, 3,3-dimethyl diphenyl disulfide-6,6-diisocyanate, 4,4-dimethyldiphenyldisulfide-5,5-diisocyanate, 3,3-dimethoxydiphenyl disulfide-4,4-diisocyanate, and 4,4-dimethoxydiphenyl disulfide-3,3-diisocyanate; a mixture thereof.

Specifically, 1,3-bis(isocyanatomethyl)cyclohexane, hexamethylene diisocyanate, isophorone diisocyanate, xylene diisocyanate, toluene diisocyanate, or the like may be used.

The polymerizable composition may further comprise such additives as an internal mold release agent, a heat stabilizer, a reaction catalyst, an ultraviolet absorber, and a blueing agent, depending on the purpose thereof.

The internal mold release agent may include a fluorine-based nonionic surfactant having a perfluoroalkyl group, a hydroxyalkyl group, or a phosphate ester group; a silicone-based nonionic surfactant having a dimethylpolysiloxane group, a hydroxyalkyl group, or a phosphate ester group; an alkyl quaternary ammonium salt such as trimethylcetylammonium salt, trimethylstearylammonium salt, dimethylethylcetylammonium salt, triethyldodecylammonium salt, trioctylmethylammonium salt, and diethylcyclohexadodecylammonium salt; and an acidic phosphate ester. It may be used alone or in combination of two or more.

As the heat stabilizer, a metal fatty acid salt, a phosphorus compound, a lead compound, or an organotin compound may be used alone or in combination of two or more.

As the reaction catalyst, a known reaction catalyst used in the preparation of a polythiourethane-based resin may be properly employed. For example, it may be selected from the group consisting of a dialkyltin halide such as dibutyltin dichloride and dimethyltin dichloride; a dialkyltin dicarboxylate such as dimethyltin diacetate, dibutyltin dioctanoate, and dibutyltin dilaurate; a dialkyltin dialkoxide such as dibutyltin dibutoxide and dioctyltin dibutoxide; a dialkyltin dithioalkoxide such as dibutyltin di(thiobutoxide); a dialkyltin oxide such as di(2-ethylhexyl)tin oxide, dioctyltin oxide, and bis(butoxy dibutyltin) oxide; and a dialkyltin sulfide such as dibutyltin sulfide. Specifically, it may be selected from the group consisting of a dialkyltin halide such as dibutyltin dichloride, dimethyltin dichloride, and the like.

As the ultraviolet absorber, benzophenone, benzotriazole, salicylate, cyanoacrylate, oxanilide, or the like may be used.

The blueing agent has an absorption band in the wavelength range from orange to yellow in the visible light region and has a function of adjusting the color of an optical material made of a resin. Specifically, the blueing agent may comprise a material that exhibits blue to violet color, but is not particularly limited thereto. In addition, examples of the blueing agent include a dye, a fluorescent whitening agent, a fluorescent pigment, and an inorganic pigment. It may be properly selected in accordance with the properties required for an optical component to be produced and the resin color. The blueing agent may be used alone or in combination of two or more.

In view of the solubility in the polymerizable composition and the transparency of the optical material to be produced, a dye is preferably used as the blueing agent. From the viewpoint of the absorption wavelength, the dye may particularly have a maximum absorption wavelength of 520 to 600 nm; and more particularly, a maximum absorption wavelength of 540 to 580 nm. In addition, in terms of the structure of the compound, an anthraquinone-based dye is preferable as the dye. The method of adding the blueing agent is not particularly limited, and the blueing agent may be added to the monomers in advance. Specifically, various methods can be used; for example, the blueing agent may be dissolved in the monomers or may be contained in a master solution in a high concentration, the master solution being later diluted with the monomers or other additives and then added.

Another embodiment provides a process for preparing a polythiourethane-based plastic lens by thermally curing the polymerizable composition as described above in a mold. According to the embodiment, the polythiourethane-based plastic lens can be prepared by the steps of (1) providing a polymerizable composition comprising an isocyanate compound, a polythiol compound, and a photoactive color correcting agent, (2) thermally curing the polymerizable composition to produce a polythiourethane-based resin, and (3) irradiating the polythiourethane-based resin with ultraviolet rays to reduce the yellow index of the polythiourethane-based resin. Further, an embodiment provides a polythiourethane-based plastic lens obtained by the preparation process as described above.

Specifically, in the step (1), a polymerizable composition as described above is prepared.

Next, in the step (2), the polymerizable composition is degassed under reduced pressures and then injected into a mold for molding a lens. Such degassing and mold injection may be carried out at a temperature of, for example, 20 to 40° C. Once the composition is injected into the mold, polymerization is usually carried out by gradually heating the composition from a low temperature to a high temperature. The polymerization temperature may be, for example, 20 to 150° C., particularly 25 to 120° C.

In such event, the shape of the mold may be variously changed depending on the application. For example, a mold having a different shape may be used depending on such application as an eyeglass lens, a camera lens, or the like.

In addition, in the step (2), the polymerizable composition may be heated at a rate of 1° C./min to 10° C./min from an initial temperature between about 0 and about 30° C. Furthermore, in the thermal curing step, the polymerizable composition may be heated to a temperature of about 100 to about 150° C. at the above rate and then maintained for 5 to 30 hours.

In the step (3), the polythiourethane-based resin formed upon the thermal curing may be subjected to irradiation of ultraviolet rays having a wavelength of 395 nm to 445 nm in the UVV region at an intensity of 1 J to 3 J to reduce the yellow index of the polythiourethane-based resin. Specifically, the polythiol composition can produce a clear and transparent plastic lens by way of irradiating the polymer formed by polymerization, i.e., the polythiourethane-based resin, with ultraviolet rays as a post-process. More specifically, the yellow index of the polythiourethane-based resin upon the irradiation of ultraviolet rays may be reduced by 0.11 or more or 0.2 or more. The ultraviolet rays may be irradiated for 5 minutes to 50 minutes, 10 minutes to 50 minutes, 5 minutes to 45 minutes, or 10 minutes to 45 minutes. Here, the light intensity can be measured by a UV Power PUCK photometer of EIT.

The polymerizable composition is prepared by mixing and polymerizing the isocyanate compound, the polythiol compound, the photoactive color correcting agent, the catalyst, the mold release agent, and so on to produce a plastic lens, followed by irradiation of ultraviolet rays with a UV lamp having a main wavelength in the above UVV region, to thereby produce a more transparent lens.

In such event, as described above, the photoactive color correcting agent may be the compound represented by Formula 1 above. The compound represented by Formula 1 above—for example, a phosphine oxide-based compound—has an absorption wavelength in the UVA region and the UVV region, so that the color of the initial polythiol composition may be yellow. However, when the lens thus prepared is irradiated with ultraviolet rays at a light intensity of 1 J to 3 J using a UV lamp having a main wavelength band in the UVV region, for example, a TL lamp, a black lamp, or the like, the inherently yellow phosphine oxide-based compound is decomposed by the ultraviolet rays, whereby the inherent yellow color is removed. This phenomenon is referred to as photo-bleaching.

Furthermore, the phosphine oxide-based compound generstes radicals as products upon decomposition by the irradiation of ultraviolet rays. At this time, radicals are also generated in the molecular structure of the polythiourethane-based resin and are bonded with the decomposion products of the phosphine oxide-based compound before they are bonded with oxygen. Therefore, the phosphine oxide-based compound may inhibit the oxidization of the polythiourethane-based resin(see FIG. 1).

In addition, since the molecular structure of the polythiourethane-based resin is not in the perfect ground state after the thermal curing, if it is changed to an excited state through the irradiation of ultraviolet rays, it readily returns to the ground state, whereby the color of the lens can be changed more transparently and clearly (see FIG. 1).

If required, the plastic lens prepared by the process as descried above may be subjected to physical or chemical treatment such as surface polishing, antistatic treatment, hard coat treatment, anti-reflection coat treatment, dyeing treatment, and dimming treatment for the purpose of imparting thereto anti-reflection, hardness, abrasion resistance, chemical resistance, anti-fogging, or fashionity.

As described above, the polythiol composition for a plastic lens according to the embodiment can produce a clear and transparent plastic lens by way of polymerizing such raw materials as a polythiol compound, an isocyanate, a photoactive color correcting agent, and the like, followed by a simple post-process such as irradiation of ultraviolet rays. In addition, since the process for preparing the lens is simple and economical, the lens is advantageously used for manufacturing various plastic lenses such as eyeglass lenses and camera lenses.

Hereinafter, the present invention is explained in detail by Examples. The following Examples are intended to further illustrate the present invention without limiting its scope.

EXAMPLE 1

Preparation of a Polythiol Composition

A mixture of tetrafunctional polythiol compounds comprising 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane was prepared in accordance with Example 1 of Japanese Laid-open Patent Publication No. Hei 7-252207. Here, the polythiol compounds contained in the mixture are structural isomers with each other. The polythiol mixture was mixed with 60 ppm of bis(2,4,6-trimethylbenzoyl)-phenylphosphine oxide (IGA-CURE 819, BASF) as a compound represented by the Formula 1 above to produce a polythiol composition.

EXAMPLES 2 TO 9 AND COMPARATIVE EXAMPLES 1

Preparation of Polythiol Compositions

The same procedure as in Example 1 was carried out to produce polythiol compositions, except that the kinds and amounts of the compounds were changed as shown in Table 1 below.

TABLE 1

| Polythiol composition | Ex. 1 | Ex. 2 | Ex. 3 | Ex. 4 | Ex. 5 | Ex. 6 | Ex. 7 | Ex. 8 | Ex. 9 | C. Ex. 1 |
|---|---|---|---|---|---|---|---|---|---|---|
| IGACURE 819 (ppm) | 60 | 80 | 100 | 200 | — | — | — | 50 | — | — |
| IGACURE TPO-L (ppm) | — | — | — | — | 10,000 | 15,000 | 30,000 | — | 5,000 | — |

IGACURE 819 and IGACURE TPO-L: BASF

EXAMPLE 10

Preparation of a Polymerizable Composition 49.3 parts by weight of the polythiol composition of Example 1, 50.7 parts by weight of xylene diisocyanate, 0.01 part by weight of dibutyltin chloride as a polymerization catalyst, and 0.1 part by weight of Zelec®UN (acidic alkyl phosphate mold release agent, Stepan Company) were uniformly mixed to produce a polymerizable composition.

EXAMPLES 11 TO 18 AND COMPARATIVE EXAMPLES 2

Preparation of Polymerizable Compositions

The same procedure as in Example 10 was carried out to produce polymerizable compositions in Examples 11 to 18 and Comparative Example 2, except that the polythiol compositions of Examples 2 to 9 and Comparative Example 1 were used, respectively, as shown in Table 1 below.

Test Example 1

Property Measurement

The properties of the polythiol compositions prepared in Examples 1 to 9 and Comparative Example 1 and those of the polymerizable compositions prepared in Examples 10 to 18 and Comparative Example 2 were measured in accordance with the methods as described below. The measurement results are shown in Tables 2 and 3 below.

(1) Measurement of b*

Each of the polythiol compositions prepared in Examples 1 to 9 and Comparative Example 1 was injected into a quartz cell having an internal thickness of 10 mm, and b* was measured using a spectrophotometer (CM-3700A, Minolta Co.). The larger the b* value is, the more transparent the liquid composition is. The results are shown in Table 2 below.

(2) Yellow Index (Y.I.)

Each of the polymerizable compositions prepared in Examples 10 to 18 and Comparative Example 2 was degassed at 600 Pa for 1 hour and then filtered through a Teflon filter of 3 μm. The polymerizable composition thus filtered was injected into a glass mold assembled by tapes. The mold was heated from 25° C. to 120° C. at a rate of 5° C./min to carry out polymerization at 120° C. for 18 hours. Then, the cured resin in the glass mold was further cured at 130° C. for 4 hours, and the molded article (i.e., plastic lens) was released from the glass mold. Here, the lens was manufactured with a circular lens plate mold having a thickness of 9 mm and a diameter of 75 mm. The transmittance ($T_{400}\%$) at 400 nm and the transmittance ($T_{450}\%$) at 450 nm of the lens thus produced were measured using a spectrophotometer (CM-3700A, Minolta Co.), to thereby produce their difference A (i.e., $T_{450}\%-T_{400}\%$).

The Y.I. value immediately after curing was measured using the same device, and the same lens was irradiated for 10 minutes with a TL lamp (Philips) so that the light intensity of the UVV was 1.5 J. Then, the Y.I. value after the irradiation was measured with the spectrophotometer. The results are shown in Table 3 below.

TABLE 2

| Polythiol composition | | Ex. 1 | Ex. 2 | Ex. 3 | Ex. 4 | Ex. 5 | Ex. 6 | Ex. 7 | Ex. 8 | Ex. 9 | C. Ex. 1 |
|---|---|---|---|---|---|---|---|---|---|---|---|
| Evaluation | b* | 2.06 | 2.24 | 2.72 | 4.00 | 2.01 | 2.50 | 2.87 | 1.87 | 1.78 | 0.98 |

TABLE 3

| Polymerizable composition | | Ex. 10 | Ex. 11 | Ex. 12 | Ex. 13 | Ex. 14 | Ex. 15 | Ex. 16 | Ex. 17 | Ex. 18 | C. Ex. 2 |
|---|---|---|---|---|---|---|---|---|---|---|---|
| Evaluation | $T_{400}\%$ | 71.4 | 64.6 | 58.6 | 40.3 | 32.1 | 10.3 | 5.2 | 79.6 | 61.2 | 95.3 |
| | $T_{450}\%$ | 98.2 | 98.0 | 98.1 | 98.0 | 98.3 | 98.2 | 98.1 | 98.2 | 98.6 | 98.7 |
| | A | 26.8 | 33.4 | 39.5 | 57.7 | 66.2 | 87.9 | 92.9 | 18.6 | 37.4 | 3.4 |
| | Y.I. after curing | 12.7 | 15.3 | 16.2 | 19.8 | 9.1 | 12.0 | 13.9 | 6.4 | 5.6 | 5.4 |
| | Y.I. after UV irradiation | 4.2 | 4.0 | 3.9 | 3.2 | 4.7 | 4.1 | 3.8 | 5.4 | 5.2 | 5.3 |

As shown in Table 2 above, the polythiol compositions of Examples 1 to 9 had b* values larger than that of the polythiol composition of Comparative Example 1, indicating that they are transparent liquids. Furthermore, as shown in Table 3 above, the plastic lenses obtained in Examples 10 to 18 had large differences in transmittance and large Y.I. values after curing as compared with the plastic lens obtained in Comparative Example 2. But the Y.I. values were significantly decreased after the UV irradiation. Therefore, it is expected that the plastic lenses produced in the Examples are advantageously used because a more transparent and clear image can be formed.

The invention claimed is:

1. A process for preparing a polythiourethane-based lens, which comprises:
   (1) providing a polymerizable composition comprising an isocyanate compound, a polythiol compound, and a photoactive color correcting agent;
   (2) thermally curing the polymerizable composition to produce a polythiourethane-based resin; and
   (3) irradiating the polythiourethane-based resin with ultraviolet rays to reduce the yellow index of the polythiourethane-based resin.

2. The process for preparing a polythiourethane-based lens of claim 1, wherein in the step (2), the polymerizable composition is heated at a rate of 1° C./min to 10° C./min from an initial temperature between about 0° C. and about 30° C.

3. The process for preparing a polythiourethane-based lens of claim 2, wherein the polymerizable composition is heated to a temperature of 100 to 150° C. and then maintained for 5 to 30 hours.

4. The process for preparing a polythiourethane-based lens of claim 1, wherein in the step (3), the yellow index of the polythiourethane-based resin after the irradiation of ultraviolet rays is reduced by 0.11 or more.

5. The process for preparing a polythiourethane-based lens of claim 1, wherein in the step (3), wherein the ultraviolet rays are irradiated at a wavelength of 395 nm to 445 nm in the UVV region at an intensity of 1 J to 3 J.

6. The process for preparing a polythiourethane-based lens of claim 5, wherein the ultraviolet rays are irradiated for 5 minutes to 50 minutes.

* * * * *